US010621549B2

(12) United States Patent
Faitelson et al.

(10) Patent No.: US 10,621,549 B2
(45) Date of Patent: Apr. 14, 2020

(54) METHOD AND APPARATUS FOR SECURE ENTERPRISE COLLABORATION

(75) Inventors: Yakov Faitelson, Elkana (IL); Ohad Korkus, Herzeliya (IL)

(73) Assignee: VARONIS SYSTEMS, LTD., Herzliya (IL)

( * ) Notice: Subject to any disclaimer, the term of this patent is extended or adjusted under 35 U.S.C. 154(b) by 498 days.

(21) Appl. No.: 13/369,307

(22) Filed: Feb. 9, 2012

(65) Prior Publication Data

US 2013/0212144 A1 Aug. 15, 2013

(51) Int. Cl.
*G06F 15/16* (2006.01)
*G06Q 10/10* (2012.01)

(52) U.S. Cl.
CPC .................. *G06Q 10/10* (2013.01)

(58) Field of Classification Search
CPC ......... G06F 17/30581; G06F 17/30286; G06F 17/30206; G06F 17/2288; G06F 17/241; G06F 17/30548; G06F 21/53; G06F 2221/2115; G06F 2221/2149; G06F 16/1834; G06F 16/2474; H04L 67/1095; H04L 63/0227; H04L 41/28; H04L 63/10; G06Q 10/10
USPC ................... 709/201; 707/E17.005, E17.032
See application file for complete search history.

(56) References Cited

U.S. PATENT DOCUMENTS

| | | | |
|---|---|---|---|
| 6,643,669 B1* | 11/2003 | Novak et al. | |
| 7,240,091 B1* | 7/2007 | Hopmann | G06Q 10/107 709/203 |
| 2006/0136511 A1* | 6/2006 | Ngo | G06F 17/2288 |
| 2007/0050362 A1* | 3/2007 | Low | G06F 21/6245 |
| 2008/0120297 A1* | 5/2008 | Kapoor | G06F 16/2308 |
| 2008/0140669 A1* | 6/2008 | Corrion | 707/10 |
| 2008/0304411 A1* | 12/2008 | Ikada | H04L 41/0896 370/232 |
| 2009/0037395 A1* | 2/2009 | Ireland | G06F 16/27 |
| 2009/0113076 A1* | 4/2009 | Long | 709/248 |
| 2009/0113540 A1* | 4/2009 | Chandwani | H04L 63/0227 726/13 |
| 2009/0198772 A1* | 8/2009 | Kim et al. | 709/203 |
| 2010/0023600 A1 | 1/2010 | Hill et al. | |
| 2010/0106684 A1* | 4/2010 | Pizzo | G06F 16/275 707/610 |
| 2011/0295806 A1* | 12/2011 | Erofeev | G06F 11/1435 707/634 |

(Continued)

OTHER PUBLICATIONS

Data synchronization, Wikipedia, Jan. 26, 2012. (Year: 2012).*

(Continued)

*Primary Examiner* — Vivek Srivastava
*Assistant Examiner* — Muhammad Raza
(74) *Attorney, Agent, or Firm* — Soroker Agmon Nordman

(57) ABSTRACT

A method for exchanging data between a remote computer and a computerized system remotely connected therebetween, the remote computer having a client application and the computerized system having a storage of objects, a system housekeeping and a service operating on an at least one computer, the method comprising retrieving by the remote computer an object of the storage under the system housekeeping by interaction of the client application with the service, affecting the retrieved object at the remote computer and updating the storage with the affected object, and an apparatus for performing the same.

18 Claims, 5 Drawing Sheets

(56) References Cited

U.S. PATENT DOCUMENTS

| | | | | |
|---|---|---|---|---|
| 2012/0096521 A1* | 4/2012 | Peddada | ............... | G06F 21/629 |
| | | | | 726/4 |
| 2012/0117457 A1* | 5/2012 | Yuniardi | ............ | G06F 17/2288 |
| | | | | 715/229 |
| 2012/0192055 A1* | 7/2012 | Antebi | .............. | G06F 17/30206 |
| | | | | 715/229 |
| 2013/0110796 A1* | 5/2013 | Butler | ..................... | G06F 16/93 |
| | | | | 707/695 |
| 2013/0151940 A1* | 6/2013 | Bailor | ..................... | G06F 17/24 |
| | | | | 715/229 |
| 2013/0191924 A1* | 7/2013 | Tedesco | .................. | G06F 21/00 |
| | | | | 726/26 |
| 2015/0199411 A1* | 7/2015 | Greenspan | ........ | G06F 17/30548 |
| | | | | 715/229 |

OTHER PUBLICATIONS

Revision control, Wikipedia, Dec. 23, 2011. (Year: 2011).*
Firewall (computing), Wikipedia, Jan. 28, 2012. (Year: 2012).*
Role-based access control, Wikipedia, Nov. 13, 2011. (Year: 2011).*
S. Kim, K. Pan. E. Sinderson, and E. J, Whitehead: "Architecture and data model of a webdav-based collaborative system", Collaborative Technologies and Systems, Jan. 2004 (Jan. 2004). pp. 48-55.

\* cited by examiner

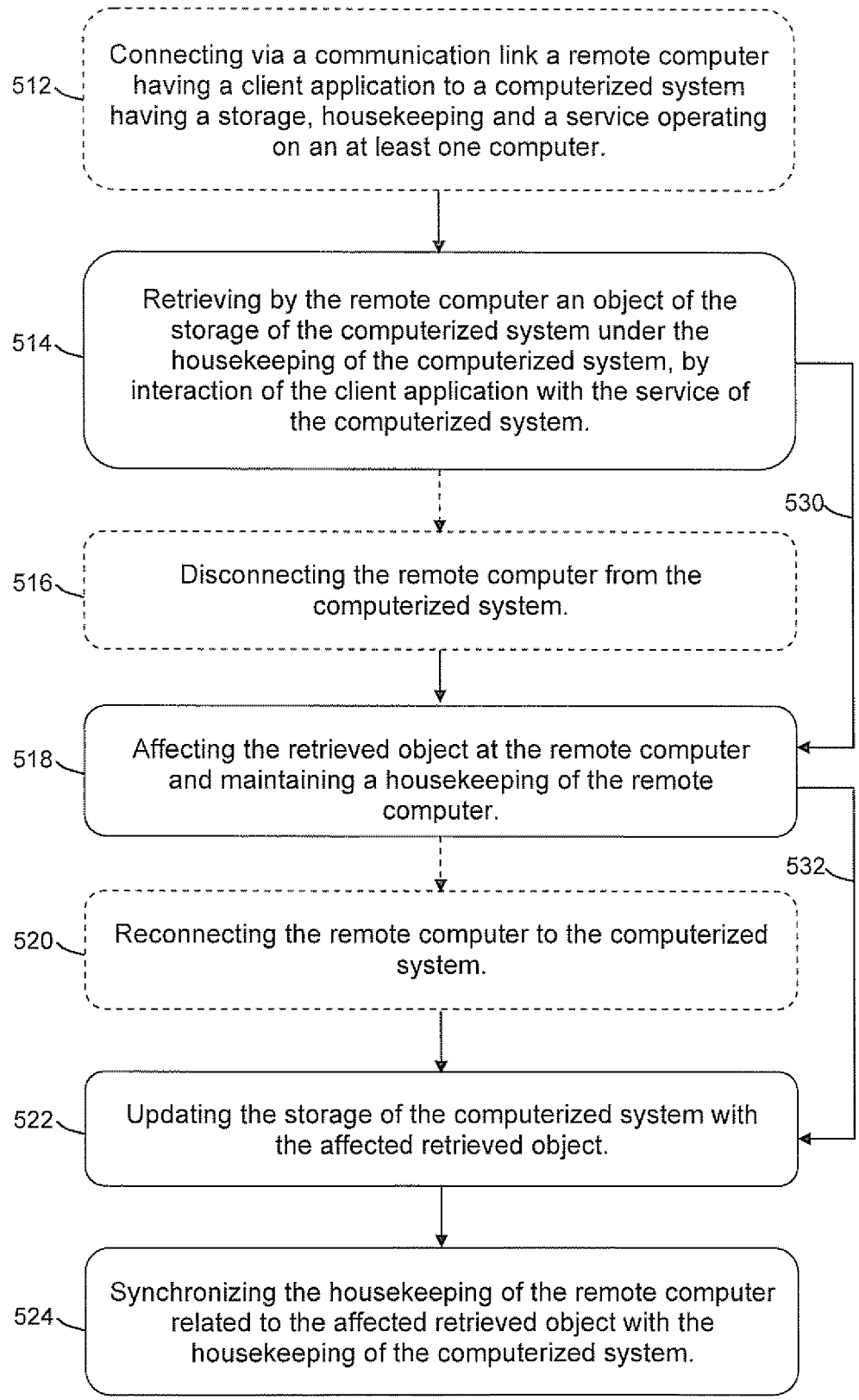

METHOD AND APPARATUS FOR SECURE ENTERPRISE COLLABORATION

BACKGROUND

The present disclosure generally relates to remotely accessing a storage, and more specifically to remotely accessing storage of an organization.

Contemporarily, remote access to servers is known, such as via the internet. For example, remote login or via VPN (virtual private network) or remote desktop access.

Generally, such access methods are oblivious of housekeeping, such as audit trail, of the servers.

SUMMARY

One exemplary embodiment of the disclosed subject matter is a method for exchanging data between a remote computer and a computerized system remotely connected therebetween, the remote computer having a client application and the computerized system having a storage of objects, a system housekeeping and a service operating on an at least one computer, the method comprising retrieving by the remote computer an object of the storage under the system housekeeping by interaction of the client application with the service, affecting the retrieved object at the remote computer and updating the storage with the affected object.

Another exemplary embodiment of the disclosed subject matter is a method for exchanging data between a remote computer and a computerized system remotely connected therebetween, the remote computer having a client application and the computerized system having a storage of objects, a system housekeeping and a service operating on an at least one computer, the method comprising, retrieving by the remote computer an object of the storage under the system housekeeping by interaction of the client application with the service, affecting the retrieved object at the remote computer, thereby forming an affected object, and updating the storage with the affected object.

In the context of the present disclosure, without limiting, the term 'enterprise' implies a computer system of one or more computers communicating therebetween and with one or more storage devices, where the enterprise is also referred to as a 'computerized system' or a 'server system'.

In the context of the present disclosure, without limiting, the term 'storage' implies one or more storage devices.

In the context of the present disclosure, without limiting, the term 'object of a storage' implies an element stored on a storage device such as a file or a user definition. An object may comprise a plurality of files or other objects, for example, linked documents or database records. When the term 'object' is used by itself an 'object of a storage' is implied, unless otherwise apparent from the context.

In the context of the present disclosure, without limiting, the term 'remote', such as remote computer or a remote storage or a remote application or a remote object implies or refers to an entity outside an enterprise, such as a computer or a storage outside the enterprise or remote to an enterprise, and the term 'local' such as a local application implies of and/or in the enterprise. The terms 'application' and 'service' imply a program and/or process operable on a computer.

In the context of the present disclosure, without limiting, the term 'housekeeping' implies rules and/or procedures and/or data or any other regime used to keep track of and/or dictate operations on and/or security of storage objects of a computer; and/or routine tasks and procedures carried out in the functioning of an operation or system (The American Heritage® Dictionary of the English Language, Fourth Edition copyright ©2000 by Houghton Mifflin Company, Updated in 2009).

Without limiting, an aspect of housekeeping is an audit trail as known in the art or as variation thereof. For example, an audit trail as pertaining to a storage is a sequence of records containing evidence resulting from operations or transactions on or manipulation of objects of the storage, such as who has done what and at what time on objects of the storage during a certain time interval.

Without limiting, an aspect of housekeeping is tracking, namely, keeping records of past operations pertaining to entities or elements of a computer or a computer system.

In the context of the present disclosure the terms as described above refer, without limiting, also to equivalents or variations thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
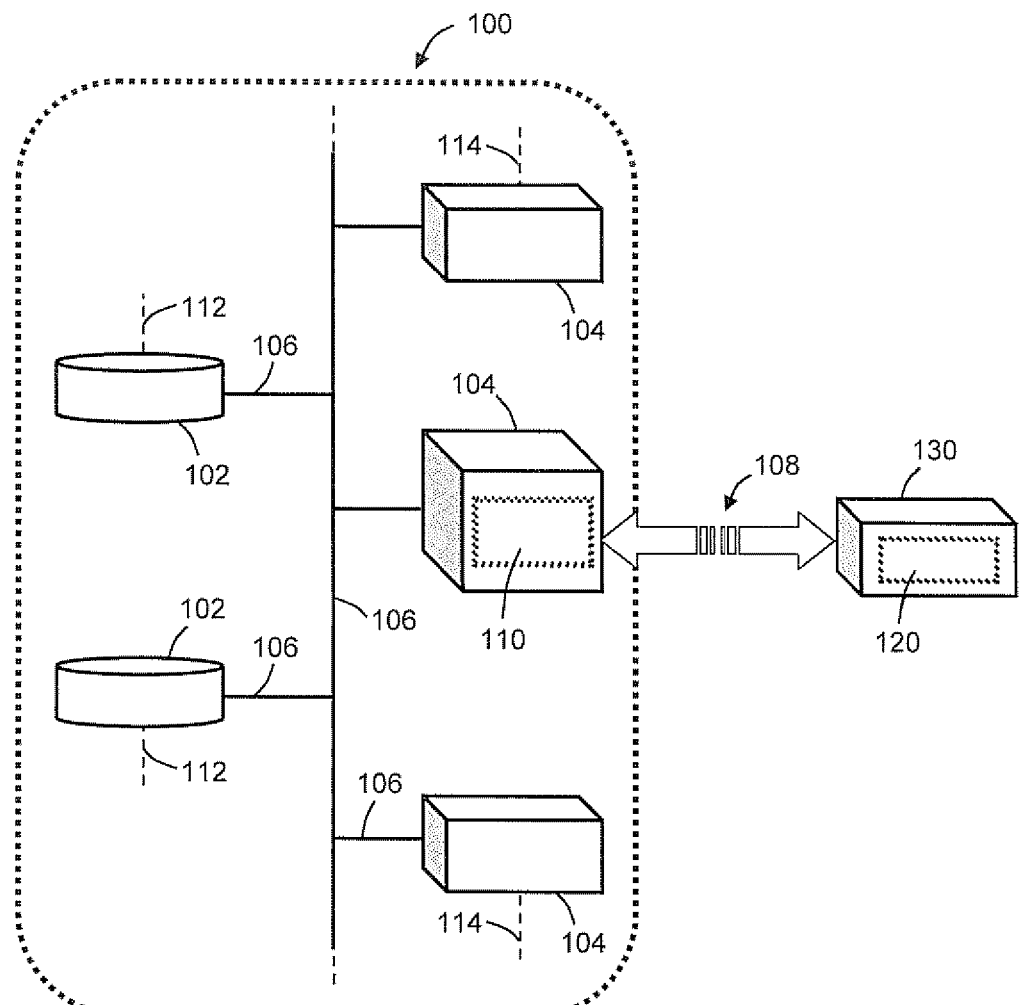

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
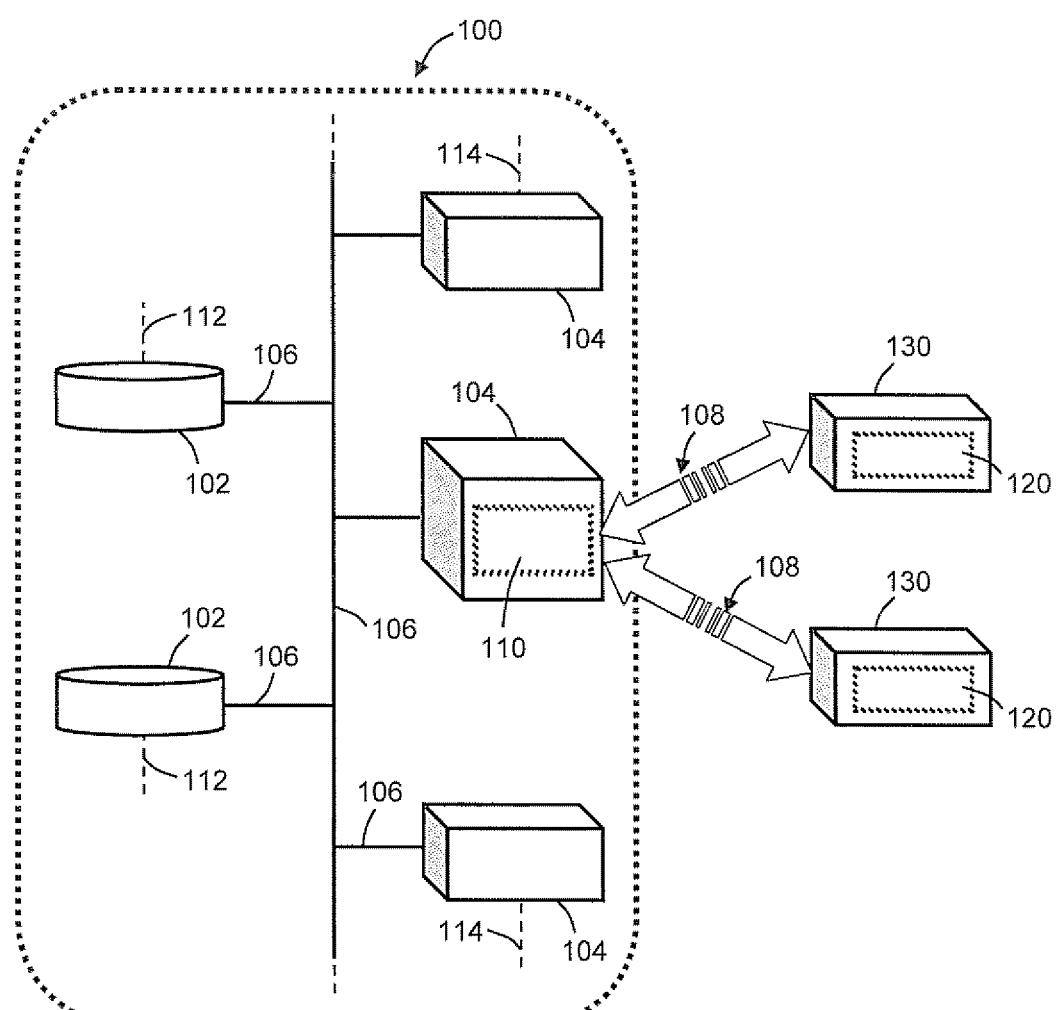
Figure 3:
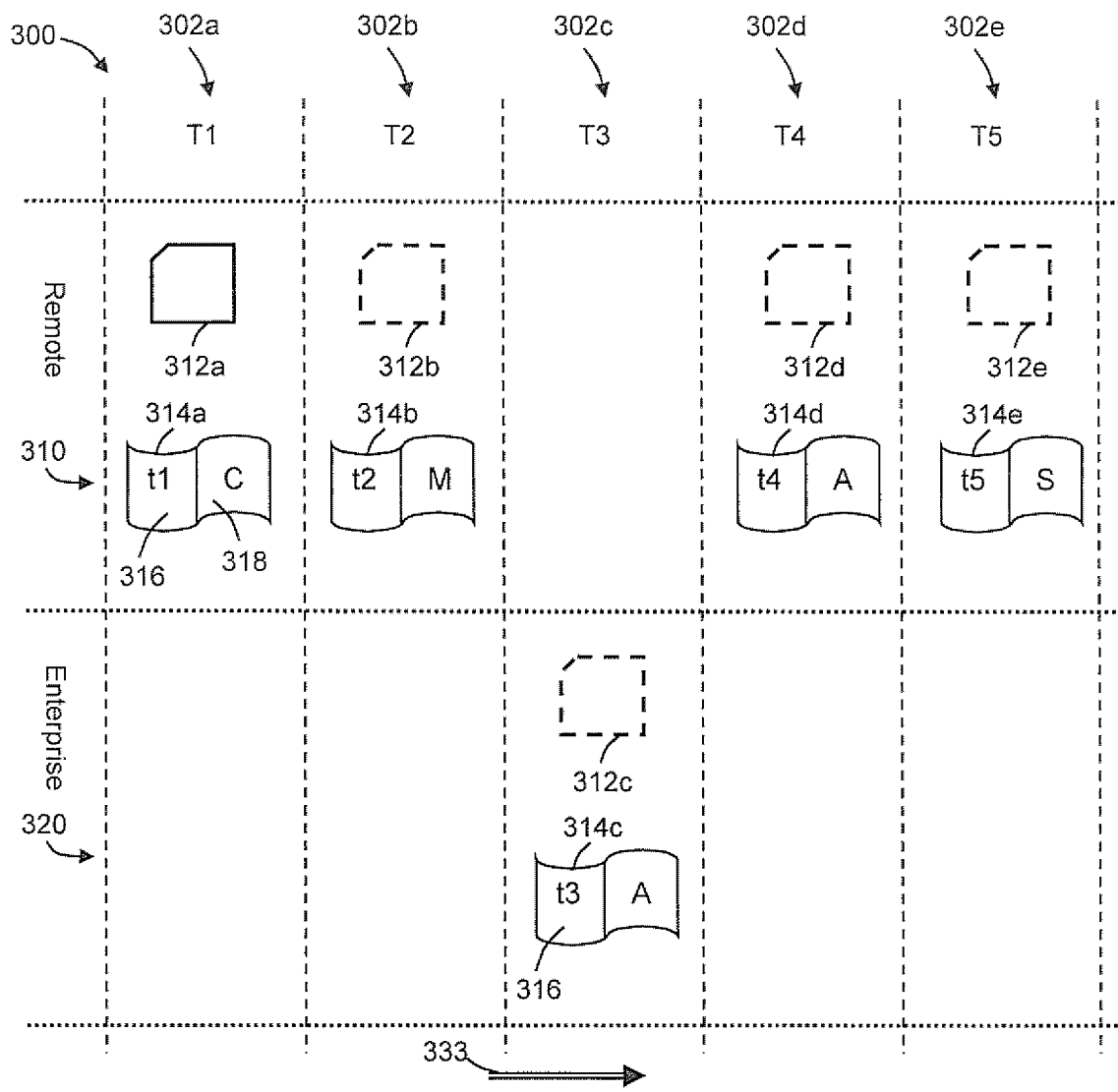
Figure 4:
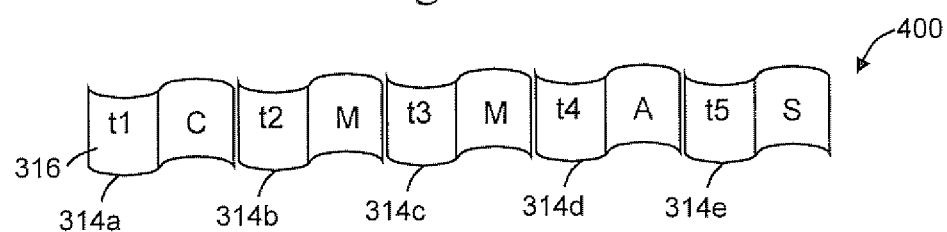
Figure 5A:
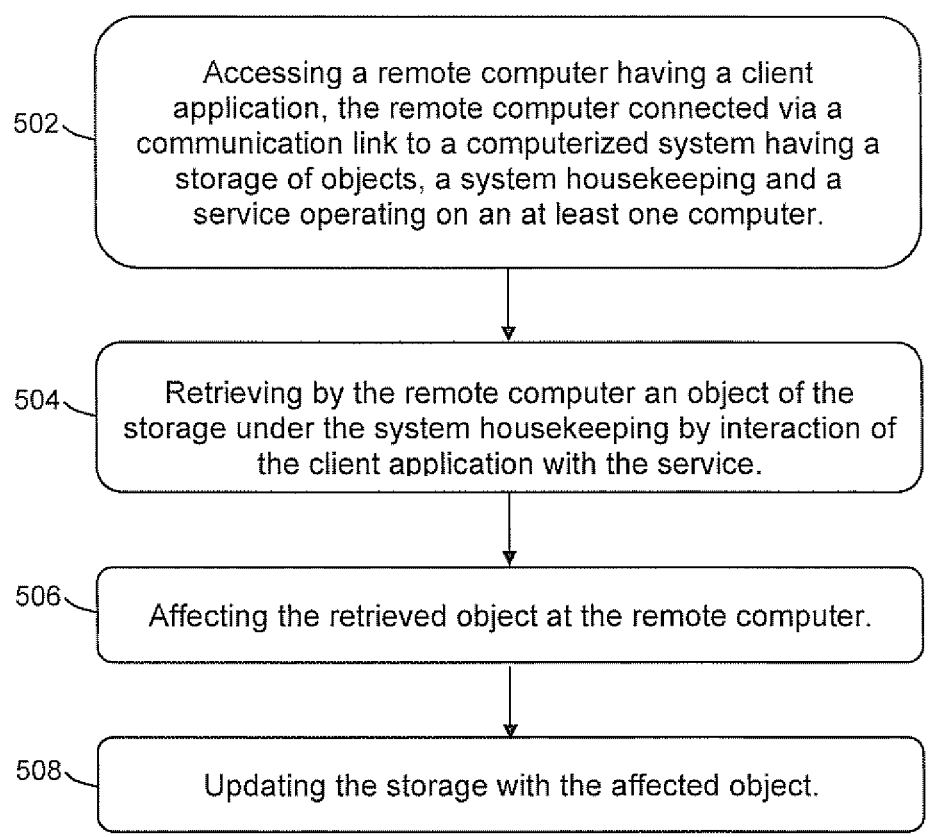

FIG. 1 schematically illustrates an enterprise with a remote computer connected thereto, according to exemplary embodiments of the disclosed subject matter;

FIG. 2 schematically illustrates an enterprise with two remote computers, representing any number of remote computers, connected thereto, according to exemplary embodiments of the disclosed subject matter;

FIG. 3 schematically illustrates a time-wise sequence of operations on and audit trail of an object of an enterprise by the enterprise and a remote computer, according to exemplary embodiments of the disclosed subject matter;

FIG. 4 schematically illustrates a synchronized audit trail of the audit trails records of FIG. 3, according to exemplary embodiments of the disclosed subject matter;

FIG. 5A outlines operations for remote collaboration with a storage of a computerized system, according to exemplary embodiments of the disclosed subject matte; and FIG. 5B further outlines operations for remote collaboration with a storage of a computerized system, according to exemplary embodiments of the disclosed subject matter.

DETAILED DESCRIPTION

One technical problem dealt by the disclosed subject matter remotely exchanging storage objects of a computerized system while synchronizing with the housekeeping of the computerized system.

One technical solution according to the disclosed subject matter is (a) a computer remotely linked via a communication link to the computerized system and comprising a client application, and (b) a computer of the computerized system comprising an enterprise service, the client application and the enterprise service are configured to interact therebetween via the communication link.

For clarity and brevity the computer remotely linked to the computerized system is also referred to as a 'remote computer' or a 'client computer' and the client application is also referred to as a 'client driver' or a 'driver', and the enterprise service is also referred to as an 'enterprise service' or a 'service'.

On one hand, by interacting with the client driver the enterprise service allows and provides for the remote computer to retrieve storage objects of the computerized system under housekeeping rules or procedures of the computerized system while tracking the access operation or operations and, if considered necessary, provide the client driver with housekeeping data related to the storage objects.

On the other hand, by interacting with the enterprise service the client driver updates or provides the computerized system with the storage objects together with housekeeping data related to operations performed on the storage objects in the remote computer. If no operation was performed on the storage objects the remote computer relinquishes the storage objects and, if considered necessary, notifies or updates the computerized system to that effect.

In case the remote computer if off-line from the computerized system, such as by disconnecting from the computerized system of due to inoperative communication link, the remote computer may still operate on the retrieved storage objects and the client driver maintains the housekeeping of the objects and operations related to the objects. When the communication is restored and the remote computer is connected to and on-line with the computerized system, the client driver updates or provides the computerized system with the storage objects together with housekeeping data related to operations performed on the storage objects in the remote computer. The updating after re-connecting is as or similar to the updating in on-line or connected state with the computerized system without disconnecting, such as described above.

In some embodiments, when on-line with the computerized system the client driver updates the computerized system responsive to events or operations, such as carrying out or completing operations on remote storage objects. Optionally or alternatively, when online with the computerized system the client driver updates the computerized system periodically, for example, on a period regime controlled by the computerized system via the enterprise service. Optionally, other techniques are used for updating the computerized system such as a combination of events and periodic regime, or by way of update requests from the enterprise service.

In some embodiments, by interacting with the client driver the enterprise service controls operations on or of the retrieved storage objects in the remote computer. For example, blocking certain operations on certain objects, preventing copying objects or preventing sending objects to another computer, setting time limits or time intervals when certain operations may be performed on certain objects, locking in the computerized system objects that were retrieved to a remote computer, or any other control that the enterprise service and/or the client driver are configured for.

In some embodiments, a plurality of remote computes may exchange storage objects with the computerized system, and the storage objects from the plurality of remote computers together with the corresponding housekeeping information are updated in the computerized system.

A potential technical effect of the disclosed subject matter is a computer application communicable with a computerized system and facilitating retrieving of objects of storage of the computerized system to a remote storage and synchronizing the objects and housekeeping data of the remote storage with the storage and housekeeping of the computerized system.

Thus, by way of a remote computer application communicable with a computerized system a user of the remote computer can collaborate with data of the computerized system, such as if being virtually inside or a part of the computerized system. Optionally or additionally, a plurality of users of a plurality of remote computers can collaborate therebetween via the computerized system.

It is noted that, at least in some embodiments, accessing a storage of the computerized system implies accessing under the security and/or privileges and/or authorization management of the computerized system and/or the housekeeping rules or procedures of the computerized system, so that a user of the computerized system can only access objects the user is authorized to, and that without duplicating or otherwise intervening in the privilege and/or authorization management of the computerized system. Thus, at least in some embodiments, a storage of the computerized system is securely accessed remotely to the computerized system.

Accordingly, by way of a remote computer application communicable with a computerized system under the security and/or privileges and/or authorization management of the computerized system and/or the housekeeping rules or procedures of the computerized system, a user of the remote computer can securely collaborate with data of the computerized system. Likewise, a plurality of users of a plurality of remote computers can securely collaborate therebetween via the computerized system.

It is also noted, at least in some embodiments, that objects of a storage of the computerized system include only objects, such as files, that belong to the computerized system or the organization of the computerized system, excluding private objects that belong to users of the computerized system and/or objects that are not considered as property of the computerized system.

The retrieval and updates of storage objects from the computerized system to the remote computer and back from the remote computer to the computerized system as described above is also referred to herein, without limiting, as 'exchange' or 'exchanging' of storage objects.

Without limiting, referring herein to operations and objects implies also to one operation and one object, respectively.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 schematically illustrates an enterprise 100 with a remote computer 130 connected thereto via a communication link 108, according to exemplary embodiments of the disclosed subject matter.

Enterprise 100 comprises one or more computers, illustrated as three instances of a computer 104, representing any number of computer 104, as indicated by dashed lines 114.

Enterprise 100 further comprises one or more storage devices, illustrated as two instances of a storage device 102, representing any number of storage device 102, as indicated by dashed lines 112. Storage device 102 generally stores objects or data entities such as files or database records or users definitions or similar elements, collectively referred to as objects.

The instances of computer 104 are connected or linked or coupled therebetween and to the instances of storage device 102, the connection or linkage illustrated and represented by a network 106.

In some embodiments, communication link 108 is an internet link, wired or wireless or a combination thereof. Optionally or alternatively, communication link 108 comprises a network link, wired or wireless, for example, Ethernet or fiberoptic cables operating according to one or more protocols such as CSMA/CD or WiFi. In some embodiments, communication link 108 operates according to TCP/IP protocol or according to another protocol or according to any combination thereof, wired and/or wireless. Optionally, communication link 108 comprises any link operating according to any protocol or protocols, either a custom and/or standard protocol, for example, a cellular link and a protocol thereof.

It is noted that communication link 108 may comprise a variety of connections, not necessarily a constant one, as long as remote computer 130 operatively connects with enterprise 100.

Remote computer 130 is connected to enterprise 100 via communication link 108 to one of computer 104 that executes or operates a service 110, illustrated schematically as a doted box. Remote computer 130 executes or operates a driver 120, illustrated schematically as a doted box.

For convenience and without limiting and unless otherwise specified, service 110 and driver 120 are considered or regarded to as interacting therebetween with each other, as well as, optionally, with other applications.

In some embodiments, service 110 operates concurrently with other programs or tasks and may be distributed among a plurality of computer 104. Likewise, driver 120 operates concurrently with other programs or tasks and may interact with other applications on remote computer 130 or on other computers.

In some embodiments, a plurality of driver 120 on a plurality of remote computer 130 interacts with service 110. Optionally or alternatively, a plurality of driver 120 on a plurality of remote computer 130 interacts with a plurality of service 110, wherein, optionally, the plurality of service 110 operate on the same computer 104 or on a plurality of computer 104 or in any combination thereof.

FIG. 2 schematically illustrates enterprise 100 with two of remote computer 130, representing any number of remote computers, connected thereto, according to exemplary embodiments of the disclosed subject matter.

It is noted that in some cases and/or some embodiments of the present disclosure, remote computer 130 is not always connected to enterprise 100. For example, communication link 108 is not operative or disconnected, at least for some time. That is, respectively, remote computer 130 is not always on-line with enterprise 100 and is off-line with enterprise 100, at least for some time.

In some embodiments, remote computer 130 is in an on-line state with enterprise 100, that is, remote computer 130 is connected to enterprise 100 via communication link 108 that is operative to enable interaction therebetween.

In some embodiments, driver 120 interacts with service 110 and requests one or more objects from storage device 102. If service 110 grants the request, service 110 fetches the one or more objects from storage device 102. In some embodiments, driver 120 fetches the one or more objects from or by way of service 110. Optionally or alternatively, service 110 sends the one or more objects to remote computer 130 by way of driver 120.

For brevity and clarity, one or more objects are collectively referred to as objects, and getting the objects from enterprise 100 is referred to also as retrieval of the objects.

Service 110 allows the retrieval of the objects by remote computer 130 under the housekeeping regime and/or security regime of enterprise 100, optionally blocking or preventing the retrieval of the objects or part thereof.

In some embodiments, remote computer 130 obtains, at least partially, the housekeeping rules and/or procedures and/or security rules of enterprise 100. For example, when remote computer 130 connects to enterprise 100 and/or periodically, service 110 sends to driver 120 housekeeping rules and/or procedures and/or security rules of enterprise 100. Optionally, remote computer 130 obtains, at least partially, the housekeeping rules and/or procedures and/or security rules of enterprise 100 as related to the objects retrieved by remote computer 130 from enterprise 100.

Remote computer 130 optionally operates on the objects, such as by manipulating the contents thereof, reading the objects, writing the objects, copying the objects, deleting the objects or performs any other operation or operations on the objects.

For generality and without limiting, operations carried out on an object are also collectively referred to as 'affecting' the object, the objects after affecting are referred to as affected objects, and wherein affecting the object brings in an 'effect' on the object, the effects involving one or more outcomes on the object.

In some embodiments, the operations carried out by remote computer 130 on the objects are performed under housekeeping and/or security rules of enterprise 100 as optionally sent to driver 120 by service 110.

Concurrently with the operations and/or periodically and/or responsive to events such as closing a file, driver 120 generates or forms housekeeping data of the operations related to the objects as performed by remote computer 130, optionally under the housekeeping rules and procedures of enterprise 100 which are, optionally and at least partially, were transferred to driver 120 from service 110.

In some embodiments, when an object is affected and/or otherwise modified in remote computer 130 then an earlier version of the object, or data indicative of the modification or the effect of on the object, or data suitable to construct the earlier version of the object is maintained in remote computer 130. Likewise, optionally, when an object is deleted, the last instance thereof or data indicative of the last instance or suitable to construct the last instance is maintained. Likewise, data of or related to other changes are maintained, such as changing metadata of an object, for example, a title or an author. In some embodiments, alternatively and/or additionally, remote computer 130 operates a versioning or a revision control of the art or variations thereof.

Without limiting, the data suitable to obtain and/or generate and/or track earlier versions of an object are also collectively referred to herein as 'versioning data', and a process or processes that yield versioning data are collectively referred to as 'versioning' such as versioning of objects.

In some embodiments, versioning of objects in remote computer 130 is independent of driver 120. Optionally or alternatively, the versioning is aided by and/or carried out by driver 120. In some embodiments, the versioning of objects in remote computer 130, at least partially, comprises a part of and/or is carried out by the housekeeping of remote computer 130.

In some embodiments, concurrently with the operation or operations on the objects and/or periodically, driver 120 updates the objects, as modified and/or otherwise affected by remote computer 130, in storage device 102 via service 110, and updates and/or synchronizes the housekeeping data of remote computer 130 with the housekeeping data of enterprise 100. In some embodiments, versioning data are updated and/or synchronized in storage device 102, optionally as a part of updating and/or synchronizing the housekeeping data of enterprise 100.

In some embodiments, when no operation was performed on an object in remote computer 130, remote computer 130 notifies service 110 to that effect. Optionally or alternatively, remote computer 130 does not notify service 110 to that effect.

In some embodiments, service 110 dictates or instructs via driver 120 what objects are allowed to be transferred to remote computer 130 and, in some embodiments, limits or restricts the operations allowed for remote computer 130 to perform on the objects and, accordingly, driver 120 controls the operations in remote computer 130. For example, service 110 blocks the transfer of certain objects to remote computer 130 or notifies driver 120 what operations remote computer 130 is allowed to perform on certain objects and/or limits the time when the operations are allowed.

In some embodiments, the instruction to driver 120 is according, at least partially, to the housekeeping regime of enterprise 100. Optionally or additionally, the instruction includes particular rules for remote computers such as remote computer 130. In some embodiments, the instruction includes rules particular to a specific remoter computer and/or a user thereof.

Thus, in some embodiments, remote computer 130 retrieves and updates, or exchanges, the objects under a regime of housekeeping of enterprise 100 and securely collaborates with enterprise 100 as if, virtually at least, remote computer 130 is a member of enterprise 100 akin to computer 104.

In some embodiments, after being in an on-line state and retrieving objects from enterprise 100 and optionally or possibly operating on the objects such as described above, remote computer 130 may or does become off-line from enterprise 100, such as deliberately disconnecting from communication link 108 or due to malfunction of communication link 108.

In some embodiments, when being off-line from enterprise 100 remote computer 130 may operates or operates on the retrieved objects independently of enterprise 100 and service 110, while forming housekeeping data as described above. Optionally, remote computer 130 operates on the retrieved objects according to housekeeping and/or security rules previously obtained such as from service 110.

In some embodiments, once remote computer 130 gets on-line with enterprise 100, by way of driver 120 via service 110 remote computer 130 updates the objects in storage device 102 and updates and/or synchronizes the housekeeping data of enterprise 100 and optionally updates and/or synchronizes the versioning data, such as described above for the on-line state or remote computer 130.

In some embodiments, after updating and/or synchronizing back with enterprise 100, remote computer 130 may or does resume the interaction between service 110 and driver 120, optionally seamlessly as if no interruption of the communication has occurred.

The housekeeping synchronization between remote computer 130 and enterprise 100 are described, by way of example, as synchronization of an audit trail, where the audit trail constitutes, at least partially, the housekeeping data of enterprise 100 and remote computer 130.

The example of audit trail synchronization is provided with respect to FIG. 3 that schematically illustrates a timewise sequence 300 of operations on and audit trail of an object of an enterprise by the enterprise and a remote computer, and FIG. 4 that schematically illustrates a synchronized audit trail 400 of the audit trails records such as generated in time sequence 300, according to exemplary embodiments of the disclosed subject matter.

Time sequence 300, oriented from left to right as indicated by an arrow 333, is divided to events or periods T1 to T5 and denoted as 302a to 302e, respectively. Operations carried on the object are generally denoted as 312, where generated corresponding audit trail records are generally denoted as 314. Time sequence 300 is further divided to a domain of the remote computer and a domain of the enterprise, the domains denoted as 310 and 320, respectively.

An audit trail record, such as 314a, comprises a time indication as a time stamp 316 and a code 318, where code 318 represents or comprises a description of the operation performed on the object, optionally further comprising offset and extent of the data used in the operation and/or other indication such as a record number in a database.

Initially before or at or about T1 the remote computer such as remote computer 130 is connected or linked to the enterprise such as enterprise 100, for example by communication link 108.

At T1 an object, denoted as 312a, is copied from the enterprise into the remote computer, and a corresponding audit trail record is generated at the remote computer and/or optionally at the enterprise, the record and/or records comprising items as the time 't1' and operation code 'C' for copy, as illustrated in audit trail record 314a.

Somewhere between T1 and T2, the remote computer disconnects from the enterprise and operates off-line of the enterprise.

At T2 the object is modified, the modified object denoted as 312b, as represented by a generated record of the audit trail of the remote computer, where the audit trail record comprising items as the time 't2' and operation code 'M' for Modify, as illustrated in audit trail record 314b.

At T3 the object at the enterprise is extended or appended with data, the extended object denoted as 312e, as represented by a generated record of the audit trail of the enterprise, where the audit trail record comprising items as the time 't3' and operation code 'A' for Append, as illustrated in audit trail record 314c.

At T4 the object at the remote computer is extended or appended with data, the extended object denoted as 312d, as represented by a generated record of the audit trail of the remote computer, where the audit trail record comprising items as the time 't4' and operation code 'A' for Append, as illustrated in audit trail record 314d.

Somewhere after T4 and before T5 the remote computer connects or links to the enterprise to operate on-line with the enterprise.

At T5 the object altered at the remote computer, denoted as 312e, is stored back to the enterprise thereby updating the enterprise with the modified object. The updating is represented by a generated record of the audit trail of the remote computer and/or the enterprise, where the audit trail record or records comprising items as the time, 't5' and operation code 'S' for Store, as illustrated in audit trail record 314e.

After the remote compute is on-line with the enterprise, the remote computer synchronizes by time stamp 316 the audit trail records of the remote computer with the audit trail record of the enterprise. That is, audit trail records denoted 314*a*, 314*b*, 314*d* and 314*e* are synchronized with audit trail record 314*c*, to form synchronized audit trail 400 audit trail with consecutive times or time stamps.

It is noted that the descriptions above with respect to FIG. 3 and FIG. 4 are provided as non-limiting examples for conveying concepts and methods of some embodiments according to the present disclosure.

FIG. 5B further outlines operations for remote collaboration with a storage of a computerized system, according to exemplary embodiments of the disclosed subject matter.

Generally, in some embodiments, the remote collaboration with a storage of a computerized system comprises an exchange of objects of the computerized system between the computerized system and the remote computer under the housekeeping of the computerized system and optionally further updating the housekeeping of the computerized system responsive to the exchange.

At 502 a remote computer having a client application, the remote computer connected via a communication link to a computerized system having a storage of objects, a system housekeeping and a service operating on an at least one computer is accessed or obtained. For example, by prior connecting or pre-connection of the remote computer with the computerized system via the communication link.

At 504 an object of the storage is retrieved by the remote computer under the system housekeeping by interaction of the client application with the service via the communication link.

At 506 the retrieved object is affected at the remote computer, where optionally the remote computer generates remote housekeeping data responsive to the effect on the affected object.

In some embodiments, affecting the object further comprises maintaining by the remote computer versioning data of the affected object.

At 508 the storage is updated with the affected object, optionally, further synchronizing the system housekeeping with the remote housekeeping data.

In some embodiments, updating the storage with the affected object further comprises updating the storage with the versioning data of the affected object.

In some embodiments, affecting the retrieved object at the remote computer is carried out, at least partially, while the remote computer is not connected to the computerized system. Subsequently, optionally, updating the storage with the affected object is carried out when the remote computer is re-connected to the computerized system.

In some embodiments, affecting the retrieved object further comprises affecting the affected object thereby forming an affected object additionally affected.

FIG. 5B further outlines operations for remote collaboration with a storage of a computerized system, according to exemplary embodiments of the disclosed subject matter.

Generally, in some embodiments, an object retrieved from the computerized system to the remote computer is stored and/or manipulated on a storage of the remote computer and/or on a storage linked to the remote computer such as a cloud storage.

At 512 a remote computer having a client application is connected via a communication link to a computerized system having a storage, housekeeping and a service operating on an at least one computer.

In some embodiments, the remote computer is already connected or pre-connected to the computerized system, such that in some embodiments connection of the remote computer to the computerized system is not a part of the present method.

The computerized system comprises one or more computers connected to one or more storage devices wherein an at least one computer executing a service configured to interact, via the communication link, with the client application.

At 514 the remote computer retrieves an object of the storage of the computerized system under the housekeeping of the computerized system, by interaction of the client application with the service of the computerized system via the communication link.

In some embodiments, the operation denoted as 514 immediately proceeds the operation denoted as 518, as illustrated by arrow 530.

At 518 the remote computer affects the retrieved object and maintains a housekeeping of the remote computer according to the effect of the object.

In some embodiments, the remote computer maintains the housekeeping of the remote computer by generating housekeeping data responsive to the effect on the object, such as generating an audit trail responsive to the effect on the object.

In some embodiments, the housekeeping of the remote computer is at least partly obtained from the housekeeping of the computerized system, such as by the client application interacting with the service via the communication link. Optionally, the housekeeping of the remote computer is at least partly obtained from the housekeeping of the computerized system as related to the objects retrieved from the computerized system by the remote computer. Accordingly, in some embodiments, the remote computer updates the housekeeping of the remote computer responsive to the effect on the object.

In some embodiments, the remote computer affects the retrieved object under the housekeeping of the remote computer.

In some embodiments, the remote computer maintains versioning of the effect on the affected object, such as keeping earlier instances of the object and/or data suitable to reconstruct the earlier instances of the object.

In some embodiments, the operation denoted as 518 immediately proceeds the operation denoted as 522, as illustrated by arrow 532.

At 522 the storage of the computerized system is updated with the affected retrieved object at the remote computer, such as by interaction of the client application with the service via the communication link.

In some embodiments, updating the storage of the computerized system comprises further updating with versioning data of the affected object, such as earlier instances of the object and/or data suitable to reconstruct the earlier instances of the object.

At 524 the housekeeping of the remote computer related to the affected retrieved object is synchronized with the housekeeping of the computerized system such as by interaction of the client application with the service via the communication link.

In some embodiments, the order of the operation denoted as 522 and the operation denoted as 524 is modified so that the operation denoted as 524 precedes the operation denoted as 522. Optionally or additionally, the operation denoted as 522 and the operation denoted as 524 are combined to one operation or concurrent operations.

In some embodiments, at 516 the remote computer disconnects from the computerized system such as due to malfunction of the communication link or deliberating disconnecting such as to save bandwidth and/or costs. Consequently the remote computer may proceed or proceeds with affecting at the remote computer the retrieved object under the housekeeping of the remote computer as in the operation denoted as 518, though disregarding and independently of the computerized system.

In some embodiments, at 520 the remote computer reconnects to the computerized system, deliberately or as the operation of the communication links is restored. Consequently the remote computer may proceed or proceeds with updating the storage of the computerized system with the affected retrieved object and/or synchronizing the housekeeping of the remote computer related to the affected retrieved object with the housekeeping of the computerized system as in the operations denoted as 522 and 524.

In some embodiments, when the remote computer is connected to the computerized system updating the storage of the computerized system with the affected retrieved object and/or synchronizing the housekeeping of the remote computer related to the affected retrieved object with the housekeeping of the computerized system is interactively 'on the fly' and/or periodically as the retrieved object is affected in the remote computer.

In some embodiments, by the interaction of the client application with the service the computerized system controls the operations carried out on the remote computer. For example, allowing or preventing certain operations on certain objects, or restricting the operations to certain times, or controlling the operations with respect to certain users of the remote computer.

By retrieving the object under the housekeeping of the computerized system, further optionally affecting the object under the housekeeping of the remote computer and/or further optionally controlling the operations on the remote computer by the computerize system, a secure collaboration and data exchange is obtained between the remote computer and the computerized system.

Referring herein to an action or operation or action under housekeeping implies according to and/or as directed and/or as controlled by the housekeeping rules and/or procedures and/or security rules.

Referring herein to a affecting of an object also implies, at least in some embodiments, to operations such as reading, deletion, copying or any other operation such as a modification of a metadata of an object and/or data about an object.

Referring herein to 'having housekeeping' implies, without limiting, an ongoing housekeeping such as executing and/or applying and/or operating the housekeeping rules and/or procedures and/or security rules and/or monitoring and/or tracking of operations performed on objects, wherein referring herein to 'ongoing' and 'operating' implies with respect to a computer a process executing and/or invokable, namely operative in response to an event and/or a process.

There is such provided according to the disclosed subject matter a method for exchanging data between a remote computer and a computerized system remotely connected therebetween, the remote computer having a client application and the computerized system having a storage of objects, a system housekeeping and a service operating on an at least one computer, the method comprising retrieving by the remote computer an object of the storage under the system housekeeping by interaction of the client application with the service, affecting the retrieved object at the remote computer and updating the storage with the affected object.

In some embodiments, the exchange comprises a retrieval of objects of the storage to the remote computer, consecutively affecting the objects by the remote computer thereby forming affected objects, and consequently updating the storage with the affected objects and updating the system housekeeping responsive to effect on the affected objects.

In some embodiments, affecting the objects further comprises generating remote housekeeping data by the remote computer responsive to effect on the affected objects.

In some embodiments, updating the system housekeeping responsive to the effect on the affected objects comprises synchronizing the system housekeeping with the remote housekeeping data.

In some embodiments, the remote housekeeping data comprises an audit trail.

In some embodiments, affecting the objects further comprises maintaining versioning data of the affected objects by the remote computer.

In some embodiments, updating the storage comprises updating the storage with the versioning data of the affected objects.

In some embodiments, affecting the objects is controlled by the system housekeeping, at least partially, as acquired by the remote computer from the computerized system.

In some embodiments, the remote computer is connected to the computerized system via a communication link.

There is further provided according to the disclosed subject matter a method for exchanging data between a remote computer and a computerized system remotely connected therebetween, the remote computer having a client application and the computerized system having a storage of objects, a system housekeeping and a service operating on an at least one computer, the method comprising, retrieving by the remote computer an object of the storage under the system housekeeping by interaction of the client application with the service, affecting the retrieved object at the remote computer, thereby forming an affected object, and updating the storage with the affected object.

In some embodiments, affecting the retrieved object comprises generating a remote housekeeping data responsive to effect on the retrieved object.

In some embodiments, updating the storage with the affected object comprises synchronizing the system housekeeping with the remote housekeeping data In some embodiments, affecting the retrieved object further comprises maintaining versioning data of the affected object by the remote computer.

In some embodiments, updating the storage with the affected object further comprises updating the storage with the versioning data of the affected object.

In some embodiments, affecting the retrieved object at the remote computer is carried out, at least partially, while the remote computer is not connected to the computerized system.

In some embodiments, affecting the retrieved object further comprises affecting the affected object thereby forming an affected object additionally affected.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The tennis 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term configuring for an objective or a variation thereof implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the disclosed subject matter. While certain embodiments of the disclosed subject matter have been illustrated and described, it will be clear that the invention is not limited to the embodiments described herein. Numerous modifications, changes, variations, substitutions and equivalents are not precluded.

The invention claimed is:

1. An apparatus for exchanging data, comprising:
   a computerized system having one or more processors, wherein the one or more processors are sharing one or more resources such as a memory, a storage of objects, a system housekeeping that maintains a system audit trail, said system audit trail comprising audit trail records indicative of operations applied to objects in the storage, each audit trail record comprising at least the exact timestamp of the applied operation, and a service operating on an at least one computer;
   a remote computer separate from the computerized system and connectable to the computerized system and having a client application, the remote computer configured for generating and maintaining therein a remote housekeeping of objects as a remote audit trail,
   the client application and the service are configured for:
   retrieving, in accordance with security rules of the computerized system, objects of the storage to the remote computer while the remote computer is connected to the computerized system, wherein the client application of the remote computer controls allowing or blocking transfer of the objects from the computerized system to the remote computer based on the security rules of the computerized system and the client application limits what operations can be performed on the objects and the time when the operations applied to the objects are allowed, and wherein objects that are not from the storage of the computerized system are excluded from being handled by the client application;
   regardless of the connection of the remote computer to the computerized system, affecting the retrieved objects at the remote computer by operations applied to the retrieved objects, thereby forming affected objects,
   generating a remote audit trail by the remote computer, said remote audit trail comprising audit trail records indicative of the operations applied to the affected object by the remote computer,
   upon establishing that the remote computer is connected to the computerized system, updating the storage with the affected objects,
   and further updating the system audit trail in the computerized system with the generated remote audit trail according to effect on the affected objects, wherein said updating includes forming a synchronized system audit trail with consecutive timestamps of the applied operations;
   wherein the remote computer is configured to deliberately disconnect from the computerized system to save bandwidth, and to deliberately reconnect to update the storage with the affected retrieved objects or synchronize the remote housekeeping of objects related to the affected objects with the system housekeeping, wherein affecting the retrieved objects is an operation selected from reading, writing, deleting, modifying, copying and storing the retrieved objects and wherein the computerized system prevents the retrieval of the objects by the remote computer based on the security rules related to the objects.

2. The apparatus according to claim 1, wherein affecting the objects further comprises maintaining versioning data of the affected objects by the remote computer.

3. The apparatus according to claim 2, wherein updating the storage comprises updating the storage with the versioning data of the affected objects.

4. The apparatus according to claim 2, wherein data suitable to construct an earlier version of the affected object is maintained on the remote computer.

5. The apparatus according to claim 1, wherein affecting the objects is controlled by the service, at least partially, via the remote computer.

6. The apparatus according to claim 1, wherein the remote computer is connected to the computerized system via a communication link.

7. The apparatus according to claim 1, wherein regardless of the connection of the remote computer to the computerized system entails prior disconnection of the remote computer from the computerized system.

8. The apparatus according to claim 1, wherein establishing that the remote computer is connected to the computerized system comprises establishing that the remote computer is connected to the computerized system after disconnection therebetween.

9. The apparatus according to claim 1, wherein the remote computer is configured to obtain the security rules related to the retrieved objects from the computerized system.

10. The apparatus according to claim 9, wherein the client application and the service are further configured for controlling operations applied to the retrieved objects by the remote computer, based on the operations that the remote computer is allowed to perform according to the security rules.

11. A method for exchanging data, comprising:
providing a remote computer that is remotely connectable to a computerized system,
the remote computer is separate from the computerized system and configured for generating and maintaining therein a remote housekeeping of objects as a remote audit trail
said remote computer further having a client application, the computerized system having: one or more processors,
wherein the one or more processors are sharing one or more resources such as a memory, a storage of objects, a system housekeeping that maintains a system audit trail, said system audit trail comprising audit trail records indicative of operations applied to objects in the storage, each audit trail record comprising at least the exact timestamp of the applied operation and a service operating on an at least one computer of the computerized system,
while the remote computer is connected to the computerized system, retrieving by the remote computer an object of the storage under the system housekeeping regime by interaction of the client application with the service, wherein the client application of the remote computer controls allowing or blocking transfer of the objects from the computerized system to the remote computer based on security rules of the computerized system and the client application limits what operations can be performed on the objects and the time when the operations applied to the objects are allowed; and wherein objects that are not from the storage of the computerized system are excluded from being handled by the client application;
regardless of the connection of the remote computer to the computerized system, affecting the retrieved object at the remote computer by applying operations on the retrieved object, thereby forming an affected object, and consequently generating the remote audit trail, said remote audit trail comprising audit trail records indicative of the operations applied to the affected object by the remote computer; and
upon establishing that the remote computer is connected to the computerized system, further updating the computerized system with the generated remote audit trail according to effect on the affected objects, wherein said updating includes forming a synchronized system audit trail with consecutive timestamps of the applied operation;
wherein the remote computer is configured to deliberately disconnect from the computerized system to save bandwidth and deliberately reconnect to update the storage with the affected retrieved objects or synchronize the remote housekeeping objects related to the affected objects with the system housekeeping,
wherein affecting the retrieved objects is an operation selected from reading, writing, deleting, modifying, copying and storing the retrieved objects and
wherein the computerized system prevents the retrieval of the objects by the remote computer based on the security rules related to the objects.

12. The method according to claim 11, wherein affecting the retrieved object further comprises maintaining versioning data of the affected object by the remote computer.

13. The method according to claim 12, wherein updating the storage with the affected object further comprises updating the storage with the versioning data of the affected object.

14. The method according to claim 11, wherein affecting the retrieved object at the remote computer is carried out, at least partially, while the remote computer is not connected to the computerized system.

15. The method according to claim 11, wherein affecting the retrieved object further comprises affecting the affected object by the remote computer, thereby forming an object that is additionally affected.

16. The method according to claim 11, wherein regardless of the connection of the remote computer to the computerized system entails prior disconnecting the remote computer from the computerized system.

17. The method according to claim 11, wherein establishing that the remote computer is connected to the computerized system comprises establishing that the remote computer is connected to the computerized system after having disconnected therebetween.

18. The method according to claim 11, wherein the object comprises a plurality of objects.

* * * * *